(12) United States Patent
Takata et al.

(10) Patent No.: US 11,148,619 B2
(45) Date of Patent: Oct. 19, 2021

(54) WIRE HARNESS THAT PROVIDES A HIGH WATERPROOFING PROPERTY

(71) Applicants: AUTONETWORKS TECHNOLOGIES, LTD., Yokkaichi (JP); SUMITOMO WIRING SYSTEMS, LIMITED, Yokkaichi (JP); SUMITOMO ELECTRIC INDUSTRIES, LTD., Osaka (JP)

(72) Inventors: Yutaka Takata, Yokkaichi (JP); Shintaro Nambara, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/992,734

(22) Filed: Aug. 13, 2020

(65) Prior Publication Data
US 2021/0053514 A1 Feb. 25, 2021

(30) Foreign Application Priority Data
Aug. 21, 2019 (JP) .............................. JP2019-151495

(51) Int. Cl.
*B60R 16/02* (2006.01)
(52) U.S. Cl.
CPC ................................ *B60R 16/0215* (2013.01)
(58) Field of Classification Search
CPC .................................................. B60R 16/0215

USPC ........................................................ 174/72 A
See application file for complete search history.

(56) References Cited

U.S. PATENT DOCUMENTS

| 2,956,109 | A | * | 10/1960 | Greco | ..................... H02G 15/18 174/138 F |
| 4,822,434 | A | * | 4/1989 | Sawaki | ............... B29C 35/0888 156/275.5 |
| 4,863,535 | A | * | 9/1989 | More | ....................... H01R 4/70 156/49 |
| 4,879,807 | A | * | 11/1989 | Roucaute | .................. H01R 4/72 29/828 |

(Continued)

FOREIGN PATENT DOCUMENTS

| JP | 2015-159070 A | 9/2015 |
| JP | 2018-032589 A | 3/2018 |
| JP | 2018-073774 A | 5/2018 |

*Primary Examiner* — Timothy J Thompson
*Assistant Examiner* — Michael F McAllister
(74) *Attorney, Agent, or Firm* — Oliff PLC

(57) ABSTRACT

A wire harness including: a wire that includes a conductor and an insulating covering that covers an outer circumference of the conductor, and that includes an exposed portion at which the conductor is exposed from the insulating covering; and a waterproofing cover that integrally covers the exposed portion and an outer surface of the insulating covering with a resin material, wherein a covering length, which is a length of a region in which the waterproofing cover covers the insulating covering, is greater than or equal to a length at which a maximum thermal stress at an edge of the waterproofing cover that is in contact with the insulating covering is equal to an adhesive strength of the resin material with respect to the insulating covering.

10 Claims, 4 Drawing Sheets

(56) References Cited

U.S. PATENT DOCUMENTS

| | | | | |
|---|---|---|---|---|
| 5,070,597 A * | 12/1991 | Holt | ...................... | F16L 58/181 |
| | | | | 29/887 |
| 5,099,088 A * | 3/1992 | Usami | ...................... | H01R 4/22 |
| | | | | 156/49 |
| 5,399,810 A * | 3/1995 | Hayami | ................... | H01R 4/70 |
| | | | | 156/49 |
| 5,641,943 A * | 6/1997 | Sawamura | ............... | H01R 4/22 |
| | | | | 174/74 A |
| 6,303,865 B1 * | 10/2001 | Yamamoto | ............... | H01R 4/70 |
| | | | | 174/17.08 |
| 7,572,979 B2 * | 8/2009 | Otsuki | ............... | H01R 13/5213 |
| | | | | 174/84 R |
| 8,740,223 B1 * | 6/2014 | Alpi | ...................... | H02G 15/18 |
| | | | | 277/314 |
| 9,018,528 B2 * | 4/2015 | Kakuta | .................... | H01R 4/22 |
| | | | | 174/72 A |
| 9,407,051 B2 * | 8/2016 | Katou | ...................... | H01R 4/70 |
| 9,997,900 B2 * | 6/2018 | Fukuda | .................. | H01B 17/38 |
| 10,937,565 B2 * | 3/2021 | Fujioka | .................... | H01R 4/72 |
| 2010/0080865 A1 * | 4/2010 | Kotani | ..................... | F16J 3/041 |
| | | | | 425/406 |
| 2012/0247828 A1 * | 10/2012 | Kakuta | ............... | B29C 35/0805 |
| | | | | 174/72 A |
| 2012/0261186 A1 * | 10/2012 | Kakuta | .................... | H01R 4/22 |
| | | | | 174/75 R |
| 2014/0299353 A1 * | 10/2014 | Saito | ...................... | H01B 7/285 |
| | | | | 174/113 R |
| 2015/0096786 A1 * | 4/2015 | Takasu | ..................... | B32B 7/00 |
| | | | | 174/145 |
| 2017/0338005 A1 * | 11/2017 | Ito | ........................... | H02G 1/14 |
| 2018/0109099 A1 * | 4/2018 | Fukumoto | ............. | H01B 7/282 |

* cited by examiner

WIRE HARNESS THAT PROVIDES A HIGH WATERPROOFING PROPERTY

BACKGROUND

The present disclosure relates to a wire harness.

In a wire harness including multiple wires, a splice portion is formed by bonding conductors that are exposed from insulating coverings of the wires to each other using a crimped terminal or the like in some cases. A wire harness including this kind of splice portion is disclosed in, for example, JP 2015-159070A, JP 2018-73774A, JP 2018-32589A, and the like. In some cases, the portion including the splice portion is covered with a material through which water is not likely to pass, such as a resin material, for the purpose of protecting the splice portion from contact with water. In particular, if the wire harness is to be used in an environment in which contact with water is likely to occur, such as an automobile interior, it is important to waterproof the splice portion. For example, JP 2015-159070A and JP 2018-73774A disclose modes in which a waterproofing member that covers the splice portion is provided in this manner. In JP 2015-159070A and JP 2018-73774A, constituent materials of the waterproofing member are studied such that a high waterproofing performance is obtained.

JP 2015-159070A, JP 2018-73774A, and JP 2018-32589A are examples of related art.

In a wire harness, from the viewpoint of improving a waterproofing property when a location at which a wire conductor is exposed from an insulating covering, such as a splice portion, is covered with a waterproofing material, it is effective to devise a material for covering the waterproofing member as in JP 2015-159070A and JP 2018-73774A. However, in this type of waterproofing member, the structure of the waterproofing material, such as the dimensions of the portions of the waterproofing member, and the relationship between the waterproofing member and other constituent members of the wire harness are also expected to influence the waterproofing performance. By studying the structure of the waterproofing member covering the portion at which the wire conductor is exposed, such as the splice portion, there is a possibility that the waterproofing performance can be further improved.

An exemplary aspect of the disclosure provides a wire harness that can provide a high waterproofing property to a location at which a wire conductor is exposed from an insulating covering.

SUMMARY

A wire harness according to an exemplary aspect includes: a wire that includes a conductor and an insulating covering that covers an outer circumference of the conductor, and that includes an exposed portion at which the conductor is exposed from the insulating covering; and a waterproofing cover that integrally covers the exposed portion and an outer surface of the insulating covering with a resin material, wherein a covering length, which is a length of a region in which the waterproofing cover covers the insulating covering, is greater than or equal to a length at which a maximum thermal stress at an edge of the waterproofing cover that is in contact with the insulating covering is equal to an adhesive strength of the resin material with respect to the insulating covering.

A wire harness according to another exemplary aspect includes a wire that includes a conductor and an insulating covering that covers an outer circumference of the conductor, and that includes an exposed portion at which the conductor is exposed from the insulating covering; and a waterproofing cover that integrally covers the exposed portion and an outer surface of the insulating covering with a resin material, wherein a covering length, which is a length of a region in which the waterproofing cover covers the insulating covering, is greater than or equal to a length at which a maximum thermal stress at an edge of the waterproofing cover that is in contact with the insulating covering is 0.5 MPa.

A wire harness according to the present disclosure can provide a high waterproofing property to a location at which a wire conductor is exposed from an insulating covering.

BRIEF DESCRIPTION OF THE DRAWINGS

FIGS. 2A and 2B show two different modes.

DETAILED DESCRIPTION OF EMBODIMENTS

Figure 1:
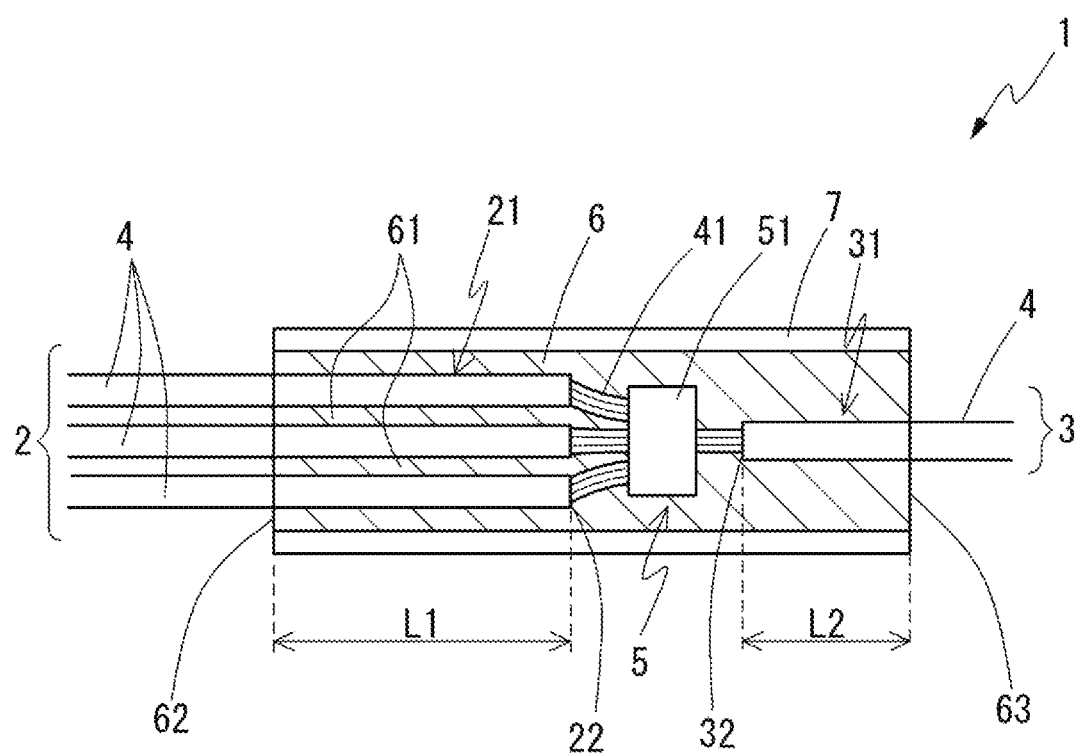
FIG. 1 is a side view showing a wire harness according to an embodiment of the present disclosure. In this drawing, a resin material filling a region enveloped by a sheet member is indicated by diagonal lines.

Description of the Embodiments of the Disclosure

First, embodiments of the present disclosure will be listed and described.

A first wire harness according to the present disclosure includes: a wire; and a waterproofing portion. The wire includes a conductor and an insulating covering that covers an outer circumference of the conductor, and includes an exposed portion at which the conductor is exposed from the insulating covering. The waterproofing portion integrally covers the exposed portion and an outer surface of the insulating covering with a resin material. A covering length, which is a length of a region in which the waterproofing portion covers the insulating covering, is greater than or equal to a length at which a maximum thermal stress at an edge of the waterproofing portion that is in contact with the insulating covering is equal to an adhesive strength of the resin material with respect to the insulating covering.

In the above-described wire harness, the waterproofing portion integrally covers the outer surface of the insulating covering of the wire and the exposed portion at which the conductor is exposed from the insulating covering. When a wire harness having this kind of waterproofing portion undergoes a change in temperature, thermal stress is likely to occur between the insulating covering and the waterproofing portion due to the material constituting the insulating covering of the wire and the resin material constituting the waterproofing portion having different expansion and contraction behaviors in response to a change in temperature. Due to the occurrence of this thermal stress, separation of the waterproofing portion from the outer surface of the insulating covering is more likely to occur. In the waterproofing portion, the thermal stress at the edge of the waterproofing portion can be reduced the longer the covering length, which is the length of the region in which the waterproofing portion covers the insulating covering, is. As a result, when the wire harness undergoes a change in temperature, it is possible to suppress a case in which the waterproofing portion separates from the edge and the waterproofing property decreases in the outer surface of the insulating covering.

In the above-described wire harness, the covering length of the waterproofing portion is set to at least a length at which the maximum thermal stress at the edge of the waterproofing portion is equal to the adhesive strength of the resin material with respect to the insulating covering. For this reason, it is easier to suppress a case in which the waterproofing portion separates from the outer surface of the insulating covering of the wire due to the adhesive strength of the waterproofing portion even if thermal stress occurs at the edge of the waterproofing portion due to a change in temperature. As a result, the waterproofing property achieved by the waterproofing portion is more likely to be maintained even in an environment that undergoes a change in temperature.

Here, it is preferable that the covering length is greater than or equal to a length at which the maximum thermal stress at the edge of the waterproofing portion is 0.5 MPa. In this case, due to the thermal stress at the edge of the waterproofing portion being suppressed to a sufficiently low level, it is possible to effectively suppress separation of the waterproofing portion resulting from the thermal stress and to protect the exposed portion from contact with water even in an environment in which the wire harness undergoes a change in temperature.

A second wire harness according to the present disclosure includes: a wire; and a waterproofing portion. The wire includes a conductor and an insulating covering that covers an outer circumference of the conductor, and includes an exposed portion at which the conductor is exposed from the insulating covering. The waterproofing portion integrally covers the exposed portion and the outer surface of the insulating covering with a resin material. A covering length, which is a length of a region in which the waterproofing portion covers the insulating covering, is greater than or equal to a length at which a maximum thermal stress at an edge of the waterproofing portion that is in contact with the insulating covering is 0.5 MPa.

Similarly to the above-described first wire harness, the second wire harness can suppress a case in which the waterproofing portion separates from the edge and the waterproofing property decreases. As the resin material used in waterproofing of the wire conductor, a resin material that has an adhesive strength of 0.5 MPa or more and maintains such an adhesive strength even when placed in a high-temperature environment is often used, but in the above-described second wire harness, the covering length of the waterproofing portion is set to at least a length at which the maximum thermal stress at the edge of the waterproofing portion is 0.5 MPa. For this reason, it is easier to suppress a case in which the waterproofing portion separates from the outer surface of the insulating covering of the wire due to the adhesive strength of the waterproofing portion even if thermal stress occurs at the edge of the waterproofing portion due to a change in temperature. As a result, the waterproofing property achieved by the waterproofing portion is easily maintained even in an environment that undergoes a change in temperature.

It is preferable that the above-described first and second wire harnesses include a plurality of the wires and further include a splice portion at which the exposed portions of the plurality of the wires are bonded, and the waterproofing portion integrally covers the splice portion and the outer surfaces of the insulating coverings. In this case, the waterproofing portion covering the splice portion at which the multiple wires are bonded to each other is not likely to separate even when a change in temperature occurs, and can provide a high waterproofing property to the splice portion.

In this case, it is preferable that the plurality of wires constitute a first wire bundle and a second wire bundle that each include one or more of the wires, the first wire bundle and the second wire bundle extend in different directions on both sides of the splice portion, the waterproofing portion integrally covers the splice portion, the outer surface of the insulating covering of the first wire bundle, and the outer surface of the insulating covering of the second wire bundle, and in both the first wire bundle and the second wire bundle, the covering length is greater than or equal to a length at which the maximum thermal stress at the edge of the waterproofing portion is equal to the adhesive strength. In this case, the maximum thermal stress is suppressed to a low level at the edges on both sides in the waterproofing portion covering the splice portion at which the two wire bundles are bonded, and the waterproofing portion is less likely to separate. Accordingly, a high waterproofing property can be provided to the splice portion covered by the waterproofing portion, even in an environment that undergoes a change in temperature.

Also, it is preferable that the plurality of wires constitute a first wire bundle and a second wire bundle that each include one or more of the wires, the first wire bundle and the second wire bundle extend in different directions on both sides of the splice portion, the waterproofing portion integrally covers the splice portion, the outer surface of the insulating covering of the first wire bundle, and the outer surface of the insulating covering of the second wire bundle, and in both the first wire bundle and the second wire bundle, the covering length is greater than or equal to a length at which the maximum thermal stress at the edge of the waterproofing portion is 0.5 MPa. In this case as well, the maximum thermal stress is suppressed to a low level at the edges on both sides in the waterproofing portion covering the splice portion at which the two wire bundles are bonded, and the waterproofing portion is less likely to separate. Accordingly, a high waterproofing property can be provided to the splice portion covered by the waterproofing portion, even in an environment that undergoes a change in temperature.

It is preferable that the number of the wires constituting the first wire bundle is greater than the number of the wires constituting the second wire bundle, and the covering length of the first wire bundle is longer than that of the second wire bundle. The greater the number of wires constituting a wire bundle is, the greater the thermal stress that occurs in the waterproofing portion is, and the more likely the waterproofing portion is to separate from the outer surface of the insulating covering. However, by making the covering length of the waterproofing portion longer in the first wire bundle, which has a greater number of wires than the second wire bundle, it is possible to effectively reduce the thermal stress at the edge of the waterproofing portion on the first wire bundle side. As a result, when the wire harness undergoes a change in temperature, it is easier to effectively suppress a case in which separation occurs in the waterproofing portion and the waterproofing property decreases on the outer surface of the first wire bundle that has a greater number of wires, and thus it is easier to maintain the waterproofing property.

Furthermore, it is preferable that the covering length of the first wire bundle is at least four times that of the second wire bundle. In this case, when the wire harness undergoes a change in temperature, it is particularly easy to effectively suppress a case in which separation caused by thermal stress occurs in the outer surface of the first wire bundle that has a greater number of wires than the second wire bundle, and thus it is easier to maintain a high waterproofing property.

It is preferable that the adhesive strength of the resin material with respect to the insulating coverings is 0.5 MPa or more. In this case, the waterproofing portion is firmly adhered to the outer surfaces of the insulating coverings of the wires. For this reason, even if thermal stress occurs in the waterproofing portion due to a change in temperature, a situation in which the waterproofing portion separates from the outer surfaces of the insulating coverings due to the thermal stress is not likely to occur.

It is preferable that the adhesive strength of the resin material with respect to the insulating coverings remains at 0.5 MPa or more in a state after the wire harness has been placed for 500 hours in an environment with a temperature of 85° C. and a humidity of 85% RH. In this case, the resin material constituting the waterproofing portion maintains the high waterproofing property even in a high-temperature environment, and the state in which the waterproofing portion is firmly adhered to the outer surfaces of the insulating coverings of the wires is likely to be maintained. Accordingly, even if thermal stress occurs in the waterproofing portion due to being in a high-temperature environment, it is possible to suppress a case in which the waterproofing portion separates from the outer surfaces of the insulating coverings due to the thermal stress. As a result, a high waterproofing property is maintained even when the wire harness is used in a high-temperature environment.

Details of Embodiments of the Present Disclosure

Hereinafter, a wire harness according to an embodiment of the present disclosure will be described with reference to the drawings. The wire harness according to the embodiment of the present disclosure includes an exposed portion at which a conductor is exposed in a wire, and a waterproofing portion covering a region including the exposed portion. Note that in the present specification, concepts indicating shapes and positions of members, such as opposite directions and a linear shape, are not limited to geometrically exact concepts, but include divergence of a degree that is allowed in a wire harness and constituent members. Also, the various properties are values that are measured in the atmosphere and at room temperature, unless specifically stated otherwise.

Overview of Structure of Wire Harness

First, an overview of a structure of a wire harness according to an embodiment of the present disclosure will be described. FIG. 1 shows an overview of a wire harness 1 according to an embodiment of the present disclosure.

The wire harness 1 includes a first wire bundle 2 and a second wire bundle 3. The first wire bundle 2 and the second wire bundle 3 each include one or multiple wires 4. In the mode shown in the drawing, the first wire bundle 2 includes three wires 4, and the second wire bundle 3 includes only one wire 4. In the present specification, a mode including only one wire 4 is also referred to as a wire bundle, as with the second wire bundle 3. In the present embodiment, the wires 4 constituting the first wire bundle 2 and the second wire bundle 3 are all the same.

Figure 2A:
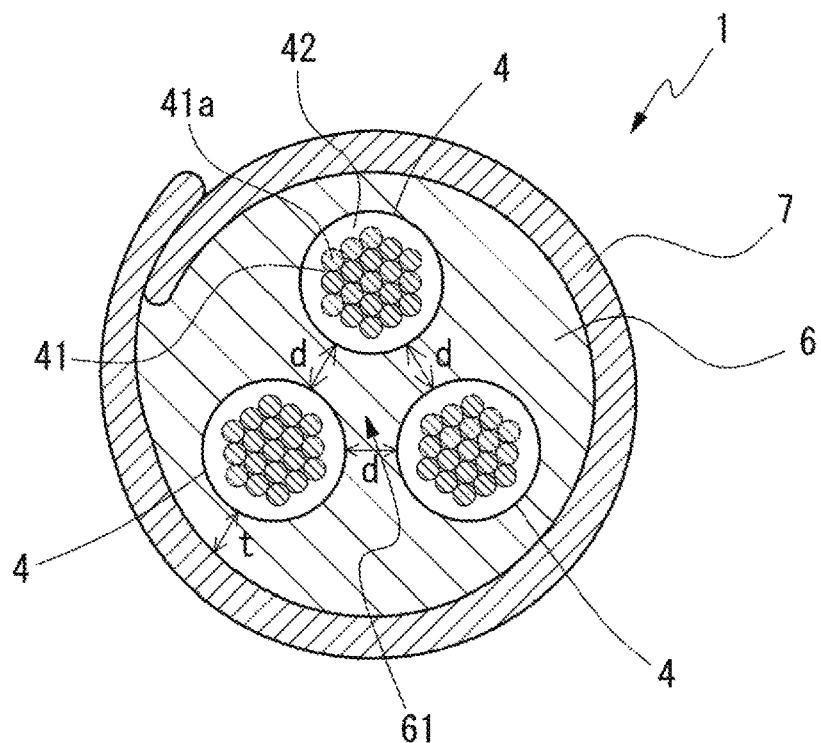
FIGS. 2A and 2B are diagrams showing cross-sections of a first covered region of the above-described wire harness.
Figure 2B:
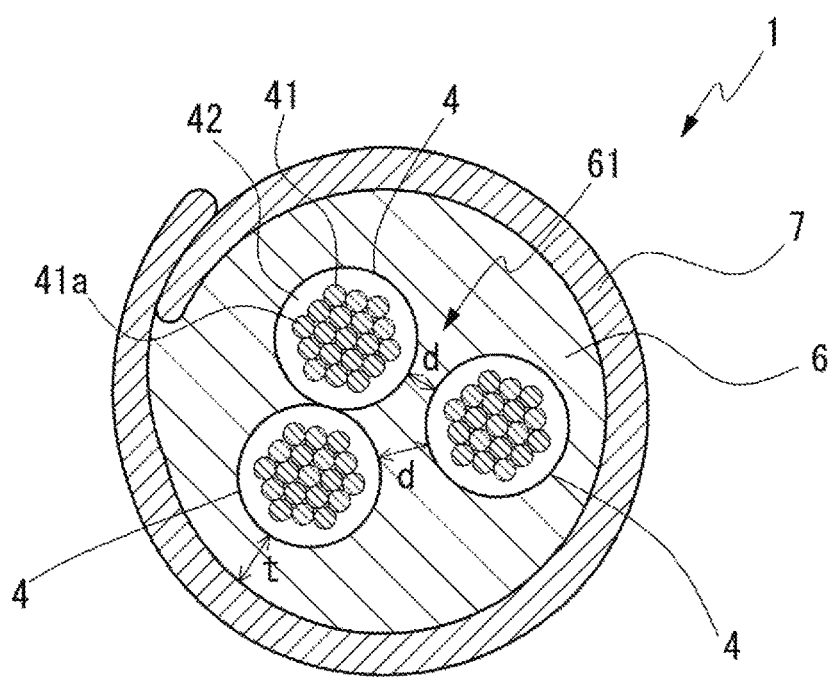

The wires 4 that constitute the first wire bundle 2 and the second wire bundle 3 each include a conductor 41 and an insulating covering 42 covering the outer circumference of the conductor 41 (see FIGS. 2A and 2B). Each wire 4 includes an exposed portion at which the insulating covering 42 is removed and the conductor 41 is exposed from the insulating covering 42. In the present wire harness 1, one (e.g., the one in the center) of the wires 4 constituting the first wire bundle 2 is one wire 4 (main wire) that is continuous with the one wire 4 constituting the second wire bundle 3, and at an intermediate portion of the main wire, the insulating covering 42 is removed to expose the conductor 41, and thus an exposed portion is formed. Exposed portions formed at end portions of the other wires 4 (branch wires) constituting the first wire bundle 2 are bonded to the exposed portion formed at the intermediate portion of the main wire by a splice portion 5 (splice body) that will be described next.

A splice portion 5 is formed between the first wire bundle 2 and the second wire bundle 3. At the splice portion 5, the exposed portions of the wires 4 constituting the first wire bundle 2 and the second wire bundle 3 are mutually bonded. The first wire bundle 2 and the second wire bundle 3 extend in different directions on both sides of the splice portion 5. In the mode shown in the drawings, the first wire bundle 2 and the second wire bundle 3 extend in straight lines in mutually opposite directions on both sides of the splice portion 5. Also, in the mode shown in the drawings, the exposed portions of the wires 4 are bonded at the splice portion 5 through crimping using a crimped terminal 51. Note that in the slice portion 5, if the conductors 41 constituting the exposed portions of the wires 4 can be electrically connected to and physically fastened to each other, the bonding of the exposed portions may be performed using any kind of means, and in addition to the crimped terminal 51, welding such as resistance welding and ultrasonic welding, and bonding using molten metal, such as soldering, can be given as examples. In the present wire harness 1, in the splice portion 5, two branch wires are bonded as the first wire bundle 2 to one main wire that is continuous from the first wire bundle 1 to the second wire bundle 3.

The wire harness 1 further includes a waterproofing portion 6 (waterproofing cover) in which the region including the splice portion 5 is covered with a resin material. The resin material constituting the waterproofing portion 6 integrally covers the splice portion 5, and a first covered region 21 and a second covered region 31 that are located on both sides of the splice portion 5. Here, the first covered region 21 and the second covered region 31 refer to portions at which the conductors 41 of the wires 4 constituting the wire bundles 2 and 3 are covered by the insulating coverings 42 in the wire bundles 2 and 3. That is, the waterproofing portion 6 integrally covers the outer surface of the insulating covering 42 of the first wire bundle 2 and the outer surface of the insulating covering 42 of the second wire bundle 3.

In the wire harness 1 according to the present embodiment, a first covering length L1, which is the length of the region in which the waterproofing portion 6 covers the first covered region 21, and a second covering length L2, which is the length of the region in which the waterproofing portion 6 covers the second covered region 31, are determined based on the maximum thermal stress at edges 62 and 63 of the waterproofing portion 6 and the adhesive strength of the waterproofing portion 6 with respect to the insulating coverings 42. The structure of the waterproofing portion 6, including the definition of the covering lengths L1 and L2 will be described in detail later. The waterproofing portion 6 acts as a waterproofing material that suppresses a case in which water (also including electrolytes; the same applies in the description hereinafter) enters the splice portion 5.

Furthermore, the wire harness 1 includes a sheet member 7. The sheet member 7 envelops the outer circumference of the waterproofing portion 6. The sheet member 7 is not necessarily provided on the wire harness 1, but by providing the sheet member 7, it is possible to easily form the waterproofing portion 6. For example, a light-curable resin composition need only be arranged on the outer surface of a clear sheet member 7, and the region including the splice portion 5 of the wire harness 1 need only be enveloped with the surface of the sheet member 7 on which the resin composition is arranged. Then, by exposing the outer side of the sheet member 7 to light and curing the resin composition, a state in which the region including the splice portion 5 is covered by the waterproofing portion 6 composed of the resin material can be easily formed. The sheet member 7 functions also as a protective member that protects the waterproofing portion 6 from contact with an external object or the like.

Although the materials constituting the portions of the wire harness 1 and the dimensions of the portions of the wire harness 1 are not particularly limited, examples of suitable materials and the like will be described hereinafter. Although the conductor 41 constituting the wire 4 may also be a single wire, it is preferable that the conductor 41 is a group of multiple strands 41a. The metal material constituting the strands 41a is not particularly limited, and copper, a copper alloy, aluminum, and an aluminum alloy can be given as examples thereof. The conductor 41 may be constituted by only strands 41a of one type, or may include strands 41a of two or more types. Also, the conductor 41 may include strands constituted by a material other than a metal material, such as organic fibers, in addition to the metal strands 41a. The insulating covering 42 included in the wire 4 is constituted by an insulating polymer material. Specific examples of the polymer material can include polyolefins such as polypropylene (PP), halogen-based polymers such as polyvinyl chloride (PVC), thermoplastic elastomers, and rubber. These polymer materials may individually constitute the insulating covering 42, or two or more may be mixed together. Various additives may also be added to the polymer material as needed. Examples of additives can include a flame retardant, a filler, and a coloring agent.

Although the cross-sectional area of the conductor of the wire 4 and the thickness of the insulating covering 42 are not particularly limited, for example, the cross-sectional area of the conductor can be in a range of 0.5 mm$^2$ or more and 5 mm$^2$ or less from the viewpoint of effectively using the effect of improving the waterproofing property resulting from mitigating stress in the waterproofing portion 6, or the like, which will be described later. Also, for example, the thickness of the insulating covering 42 can be in a range of 0.2 mm or more and 0.7 mm or less.

The type of the resin material constituting the waterproofing portion 6 is also not particularly limited, as long as it is an insulating polymer material. However, from the viewpoint of easily forming the waterproofing portion 6, it is preferable that the waterproofing portion 6 can be formed by arranging a thermoplastic resin, various curable resins, or the like at a predetermined location in a highly fluid state, and thereafter allowing it to solidify. In particular, it is preferable to use a curable resin as the resin material. Examples of the curable resin can include a light-curable resin, a heat-curable resin, a moisture-curable resin, and a two-component reaction curable resin. From the viewpoint of the ease of forming the waterproofing portion 6, among these resins, it is preferable to use a light-curable resin.

Although the resin type of the resin material constituting the waterproof portion 6 is also not particularly limited, examples thereof can include silicone-based resin, acrylic resin, epoxy-based resin, urethane-based resin, and the like. Among these, it is preferable to use acrylic resin. Examples of light-curable acrylic resin can suitably include urethane (meth)acrylate-based resins, epoxy(meth)acrylate-based resins, polyester (meth)acrylate-based resins, and the like. It is possible to use only one, or two or more types in combination as the resin material constituting the waterproofing portion 6. Various additives may also be added to the resin material as needed. Examples of additives can include a reaction starting agent, a flame retardant, a filler, and a coloring agent.

If the wire harness 1 includes the sheet member 7, the material constituting the sheet member 7 is not particularly limited, as long as it is an insulating polymer material. Examples of polymer materials can include polyolefins such as polypropylene, halogen-based polymers such as PVC, polyesters such as polyethylene terephthalate, and polyamides such as nylon. Various additives may also be added to the polymer material as needed. Also, from the viewpoint of ease when arranging and fixing the sheet member 7 on the predetermined region of the outer circumference of the splice portion 5 via the waterproofing portion 6, it is preferable that the sheet member 7 is constituted by adhesive tape having an adhesion layer on which a bonding agent or an adhesive is arranged. In this case, the surface on which the adhesion layer is provided is the surface that is to be in contact with the waterproofing portion 6. If the resin material constituting the waterproofing portion 6 is a light-curable resin, it is preferable that the sheet member 7 is composed of a transparent material through which the light used to cure the resin material passes, such that the resin material is cured through exposure to light via the sheet member 7.

Configuration of Waterproofing Portion

Here, the waterproofing portion 6 provided in the wire harness 1 will be described in detail. As described above, the waterproofing portion 6 integrally covers the splice portion 5, the first covered region 21, and the second covered region 31 with a resin material in the wire harness 1.

In the wire harness 1 according to the present embodiment, the first covering length L1, which is the length of the region in which the waterproofing portion 6 covers the outer surface of the insulating covering 42 of the first wire bundle 2 in the first covered region 21, is greater than or equal to a reference length L'1, and the second covering length L2, which is the length of the region in which the waterproofing portion 6 covers the outer surface of the insulating covering 42 of the second wire bundle 3 in the second covered region 31, is greater than or equal to a reference length L'2. Here, the first covering length L1 and the second covering length L2 respectively correspond to the distance from the position of the edge 22 of the covered region 21 opposing the splice portion 5 to the position of the edge 62 of the waterproofing portion 6 and the distance from the position of the edge 32 of the covered region 31 opposing the splice portion 5 to the position of the edge 63 of the waterproofing portion 6 along the axial direction in the first wire bundle 2 and the second wire bundle 3. Also, the reference lengths L'1 and L'2 refer to lengths at which the maximum thermal stress at the edges 62 and 63 of the waterproofing portion 6 are equal to the adhesive strength of the resin material constituting the waterproofing portion 6 with respect to the insulating covering 42.

That is, the first covering length L1 is greater than or equal to the first reference length L'1, where the first reference length L'1 is the length at which the maximum thermal stress at the edge 62 of the waterproofing portion 6 on the first covered region 21 side becomes equal to the adhesive strength of the resin material with respect to the insulating covering 42 (L1≥L'1). Also, the second covering length L2 is greater than or equal to the second reference length L'2, where the second reference length L'2 is the length at which the maximum thermal stress at the edge 63 of the waterproofing portion 6 on the second covered region 31 side becomes equal to the adhesive strength of the resin material with respect to the insulating covering 42 (L2≥L'2). The thermal stress and the adhesive strength are physical amounts indicating force per unit area, and are expressed in units of MPa. As will be described later, the maximum thermal stress at the edges 62 and 63 of the waterproofing portion 6 depends on the number of the wires 4 covered by the waterproofing portion 6, and the like, and in general, the first reference length L'1 and the second reference length L'2 do not match each other.

Here, the relationship between the maximum thermal stress at the edges 62 and 63 of the waterproofing portion 6 and the covering lengths L1 and L2 of the waterproofing portion 6 will be described. In the wire harness 1, when the splice portion 5 or a portion in the vicinity thereof undergoes a change in temperature, the waterproofing portion 6 and the insulating coverings 42 of the wires 4 expand and contract. However, the waterproofing portion 6 and the insulating coverings 42 are normally constituted by different materials, and the expansion and contraction behaviors in response to a change in temperature are different from each other. In this case, when undergoing a change in temperature, the waterproofing portion 6 and the insulating coverings 42 are less likely to follow each other's deformation, and thermal stress occurs between the waterproofing portion 6 and the insulating coverings 42. Due to this thermal stress, the waterproofing portion 6 separates from the outer surfaces of the insulating coverings 42 in some cases. The separation occurs at the edges 62 and 63 of the waterproofing portion 6. In particular, after the waterproofing portion 6 and the insulating coverings 42 undergo heating, separation of the waterproofing portion 6 is likely to occur accompanying contraction that occurs during cooling. This is because various curable resins that are commonly used as waterproofing materials often have lower thermal contraction rates than materials that are often used as the insulating coverings 42 of the wires 4, such as PVC or polyolefin, and thus when the waterproofing portion 6 is formed using such a waterproofing material, the waterproofing portion 6 is not likely to follow the contraction of the insulating coverings 42.

The thermal stress that occurs between the insulating coverings 42 of the wires 4 and the waterproofing portion 6 during a change in temperature can be mitigated in the resin material constituting the waterproofing portion 6. Through this stress mitigation, separation of the waterproofing portion 6 can be made less likely to occur. The effect of the stress mitigation in the waterproofing portion 6 increases the longer the length of the region surrounding the insulating covering 42 of one wire bundle 2 (3) is, that is, the longer the covering length L1 (L2), which is the length of the waterproofing portion 6 covering the covered region 21 (31), is. This is because the amount of the resin material that can contribute to the stress mitigation increases. As a result, the maximum thermal stress at the edge 62 (63) of the waterproofing portion 6 decreases the longer the covering length L1 (L2) of the waterproofing portion 6 is. This is shown through a simulation in working examples hereinafter as well.

Note that the maximum thermal stress at the edges 62 and 63 of the waterproofing portion 6 indicates the maximum value of the thermal stress that is observed at the surfaces (end surfaces) exposed at the edges 62 and 63 of the waterproofing portions 6, which is observed when the temperature is changed at each position of the surface, and indicates that the smaller the value is, the greater the effect of the stress mitigation at the waterproofing portion 6 is. The greater the effect of the stress mitigation is and the smaller the maximum thermal stress at edges 62 and 63 of the waterproofing portion 6 is, the more it is possible to suppress a case in which the waterproofing portion 6 separates at the outer surface of the insulating covering 42 using the edges 62 and 63 as origins.

On the other hand, even if thermal stress occurs at the edges 62 and 63 of the waterproofing portion 6 in some cases, separation is less likely to occur the more firmly the waterproofing portion 6 adheres closely to the insulating coverings 42 of the wires 4. As long as the maximum thermal stress at the edges 62 and 63 of the waterproofing portions 6 is greater than or equal to the adhesive strength of the resin material constituting the waterproofing portion 6, separation of the waterproofing portion 6 from the insulating coverings 42 is not likely to occur, even if thermal stress occurs in the waterproofing portion 6 during a change in temperature.

As described above, the maximum thermal stress at the edges 62 and 63 decreases the longer the covering lengths L1 and L2 of the waterproofing portion 6 are made. Accordingly, as long as the actual covering lengths L1 and L2 are greater than or equal to the reference lengths L'1 and L'2 respectively, where the reference lengths L'1 and L'2 are the covering lengths at which the maximum thermal stress of the edges 62 and 63 of the waterproofing portion 6 is equal to the adhesive strength of the resin material on the first covered region 21 side and the second covered region 31 side respectively (L1≥L'1, L2≥L'2), the maximum thermal stress of the edges 62 and 63 of the waterproofing portion 6 is suppressed to be less than or equal to the adhesive strength of the waterproofing portion 6 with respect to the insulating covering 42. As a result, even if the waterproofing portion 6 undergoes a change in temperature, the thermal stress that occurs in the edges 62 and 63 is easily suppressed to be less than or equal to the adhesive strength of the waterproofing portion 6 with respect to the insulating covering 42, and the state in which the waterproofing portion 6 adheres to the insulating coverings 42 at the edges 62 and 63 is easily maintained. That is, the waterproofing portion 6 is not likely to separate from the outer surface of the insulating coverings 42, and a high waterproofing property is likely to be maintained.

The maximum thermal stress at the edges 62 and 63 of the waterproofing portion 6 constituted by a specific material can be estimated through, for example, a simulation using computer aided engineering (CAE). The adhesive strength of the resin material can be measured as, for example, the tensile shear adhesive strength, in conformity with JIS K 6850. The reference lengths L'1 and L'2 need only be defined using the adhesive strength in an initial state before the waterproofing portion 6 undergoes a change in temperature. However, if the adhesive strength of the resin material constituting the waterproofing portion 6 decreases in a high-temperature environment, it is preferable that the actual covering lengths L1 and L2 are greater than or equal to reference lengths L'1 and L'2 that were estimated using the adhesive strength after being placed in an envisioned high-temperature environment, such as a state after being placed for 500 hours in an environment at a temperature of 85° C. and a humidity of 85% RH.

As described above, in the wire harness 1 according to the present embodiment, due to the covering lengths L1 and L2 of the waterproofing portion 6 being greater than or equal to the reference lengths L'1 and L'2, at which the maximum thermal stress of the edges 62 and 63 is equal to the adhesive strength, the state in which the waterproofing portion 6 closely adheres to the insulating coverings 42 and exhibits a high waterproofing property can be maintained even if thermal stress occurs in the waterproofing portion 6. Due to the fact that the high waterproofing property can be maintained even during a change in temperature, the present wire harness 1 can be suitably applied in an environment that is likely to come into contact with water and frequently undergoes a change in temperature, such as an automobile interior.

As long as the first covering length L1 and the second covering length L2 of the waterproofing portion 6 are greater than or equal to the respective reference lengths L'1 and L'2 as described above, their absolute values are not particularly defined, but it is preferable that they are 3 mm or more, 10 mm or more, or 15 mm or more. Also, although the first covering length L1 and the second covering length L2 are not particularly provided with upper limits, from the viewpoint of avoiding a case in which the waterproofing portion 6 becomes excessively long, it is preferable that the first covering length L1 and the second covering length L2 are suppressed to 240 mm or lower, as long as the reference lengths L'1 and L'2 or more can be ensured. The covering lengths L1 and L2 may also be 200 mm or less, 150 mm or less, or 100 mm or less.

As described above, the smaller the maximum thermal stress at the edges 62 and 63 of the waterproofing portion 6 is, the easier it is to suppress a case in which the waterproofing portion 6 separates from the outer surface of the wire 4. It is preferable that the maximum thermal stress at the edges 62 and 63 of the waterproofing portion 6 is 0.7 MPa or less, or 0.5 MPa or less. In this case, the waterproofing portion 6 is likely to maintain a sufficient waterproofing property with respect to an envisioned change in temperature in the wire harness 1 that is used in an automobile. The magnitude of the maximum thermal stress at the edges 62 and 63 of the waterproofing portion 6 can be reduced by increasing the covering lengths L1 and L2 and by suitably selecting the resin material constituting the waterproofing portion 6 as described above.

On the other hand, the greater the adhesive strength of the resin material constituting the waterproofing portion 6 with respect to the insulating coverings 42 is, the easier it is to suppress a case in which the waterproofing portion 6 separates from the outer surfaces of the wires 4. The adhesive strength is preferably 0.5 MPa or more, and more preferably 1.0 MPa or more. Also, although some resin materials constituting the waterproofing portion 6 degenerate in a high-temperature environment and the adhesive strength decreases, from the viewpoint of effectively suppressing reduction of the waterproofing property during a change in temperature, it is preferable to use, as the resin material constituting the waterproofing portion 6, a resin material that can maintain a high adhesive strength even in a high-temperature environment. Specifically, it is preferable that the adhesive strength of the resin material constituting the waterproofing portion 6 with respect to the insulating coverings 42 maintain 0.3 MPa or more, and more preferably 0.5 MPa or more in a state after both are adhered to each other and placed for 500 hours in an environment with a temperature of 85° C. and a humidity of 85% RH.

In the present wire harness 1, the numbers of wires 4 constituting the first wire bundle 2 and the second wire bundle 3 are not particularly limited, but may be the same as or different from each other. However, if the numbers of the wires 4 constituting the first wire bundle 2 and the second wire bundle 3 are different from each other, the first reference length L'1 and the second reference length L'2 respectively defining the first covering length L1 and the second covering length L2 are different from each other. The reason for this is as follows.

The thermal stress that occurs between the waterproofing portion 6 and the insulating coverings 42 during a change in temperature increases when the number of the wires 4 that constitute one wire bundle 2 (3) and are covered by the waterproofing portion 6 is greater. This is because the total volume of the insulating covering 42 that expands and contracts due to a change in temperature is greater. That is, the greater the number of the wires constituting the wire bundle 2 (3) is, the greater the thermal stress that occurs between the wire bundle 2 (3) and the waterproofing portion 6 during a change in temperature is, and the more likely it is that separation of the waterproofing portion 6 will occur due to thermal stress. Accordingly, the reference length L'1 (L'2) at which the maximum thermal stress at the edges 62 and 63 of the waterproofing portion 6 becomes equal to the adhesive strength with respect to the insulating coverings 42 of the resin material constituting the waterproofing portion 6 is longer the greater the number of the wires 4 constituting the wire bundle 2 (3) is. Accordingly, as in the mode shown in the drawings, if the number of the wires 4 constituting the first wire bundle 2 is greater than the number of the wires 4 constituting the second wire bundle 3, the first reference length L'1 will be longer than the second reference length L'2 (L'1>L'2).

Also, it is preferable that if the number of the wires 4 constituting the first wire bundle 2 is greater than the number of the wires 4 constituting the second wire bundle 3, the first covering length L1 is longer than the second covering length L2 in the actual waterproofing portion 6. (L1>L2). In this case, on the first covered region 21 side, in which there is a large number of the wires 4 constituting the wire bundle 2 and a large amount of thermal stress is likely to occur at the edge 62 of the waterproofing portion 6, the effect of stress mitigation in the waterproofing portion 6 works significantly. As a result, the maximum thermal stress is suppressed to a low level at the edge 62 of the waterproofing portion 6 on the first covered region 21 side, and it is possible to effectively suppress a case in which the waterproofing portion 6 separates from the outer surfaces of the wires 4.

Furthermore, if the number of the wires 4 constituting the first wire bundle 2 is greater than the number of the wires 4 constituting the second wire bundle 3, the effect of suppressing separation of the waterproofing portion 6 due to stress mitigation increases in the first covered region 21 the longer the first covering length L1 is. For example, if the first covering length L1 is set to be at least four times, at least five times, or at least seven times the second covering length L2, or if the number of the wires 4 of the first wire bundle 2 is N times the number of the wires 4 of the second wire bundle 3, separation of the waterproofing portion 6 in the first covered region 21 can be effectively suppressed as long as the first covering length L1 is at least N times or at least 1.5N times the second covering length L2.

In order to protect the splice portion 5 from contact with water or the like, the waterproofing portion 6 needs to cover the entire circumference of the splice portion 5, but it is preferable that the waterproofing portion 6 covers not only the splice portion 5 but also the entire circumferences of the covered regions 21 and 31 on both sides. Even if the sheet member 7 is arranged on the outer circumference of the waterproofing portion 6, it is preferable that the resin material is arranged covering the entire circumferences of the splice portion 5 and the covered regions 21 and 31 between the sheet member 7 and the splice portion 5 and between the sheet member 7 and the covered regions 21 and 31, and thus the waterproofing portion 6 is formed. Due to the waterproofing portion 6 being arranged on the entire circumferences of the splice portion 5 and the covered regions 21 and 31, the amount of the resin material that surrounds the wire bundles 2 and 3 and contributes to the mitigation of thermal stress increases, and it is easier to improve the waterproofing property of the waterproofing portion 6. Also, it is possible to effectively protect the splice portion 5 from the occurrence of damage due to contact with an external object, and from a reduction in insulation. Note that from the viewpoint of sufficiently utilizing these effects, it is preferable that the thickness of the waterproofing portion 6 on the outer circumferences of the covered regions 21 and 31 is 50% or more, or more preferably 100% or more, 120% or more, or 150% or more of the outer diameter of the wires 4 at a distance (distance t in FIGS. 2A and 2B) from the outer surface of the wires 4 constituting the covered regions 21 and 31 to the outer edge of the waterproofing portion 6. It is not likely that the effect of improving the waterproofing property resulting from thermal stress mitigation will be further improved even if the thickness of the waterproofing portion 6 is increased beyond that thickness.

In the covered regions 21 and 31, the waterproofing portion 6 may also merely cover the outer circumference of the entirety of the first wire bundle 2 and the second wire bundle 3 in a tubular shape, but it is preferable that, as indicated by the cross-section of the wire harness 1 of the first covered region 21 in FIGS. 2A and 2B, the resin material covers the outer circumferential region of the wire bundle 2, and an inter-wire filling portion 61 obtained by the resin material filling the region between the wires 4 constituting the wire bundle 2. That is, it is preferable that a gap (shown as distance d in the drawings) is included between at least two adjacent wires 4, and the resin material fills the gap. In the mode shown in FIG. 2A, the resin material fills the entirety of the region between the wires 4 and thus the inter-wire filling portion 61 is formed. In the mode shown in FIG. 2B, the resin material fills a region between some of the wires 4 and thus the inter-wire filling portion 61 is formed.

Due to the waterproofing portion 6 including the inter-wire filling portion 61, the area of contact between the resin material and the wire 4 increases in the waterproofing portion 6, and the adhesion of the waterproofing portion 6 with respect to the wires 4 can be increased. Also, due to the existence of the inter-wire filling portion 61, the amount of resin material that surrounds the wires 4 and contributes to the mitigation of thermal stress increases, and therefore when a change in temperature is undergone, the effect of mitigating the thermal stress and suppressing the separation of the waterproofing portion 6 improves. Accordingly, due to the inter-wire filling portion 61 being formed, the waterproofing property achieved by the waterproofing portion 6 can be further improved. In particular, as shown in FIG. 2A, an excellent effect of improving the waterproofing property is obtained by forming the inter-wire filling portion 61 in the entire region between the wires.

Other Modes

In the wire harness 1 described above, the covering lengths L1 and L2 of the waterproofing portion 6 are set to be greater than or equal to the reference lengths L'1 and L'2 at which the maximum thermal stress at the edges 62 and 63 of the waterproofing portion 6 is equal to the adhesive strength of the resin material with respect to the insulating coverings 42. However, instead of defining the covering lengths L1 and L2 of the waterproofing portion 6 based on the value of the adhesive strengths of the separate resin materials in this manner, the covering lengths L1 and L2 may also be set to be greater than or equal to a length at which the maximum thermal stress at the edges 62 and 63 of the waterproofing portion 6 is 0.5 MPa. Most resin materials that are commonly used for waterproofing of a conductor of a wire have an adhesive strength of 0.5 MPa in an initial state with respect to the insulating covering. Furthermore, the adhesive strength of 0.5 MPa or more is often maintained even after high-temperature endurance at around 100° C. In view of this, as long as the covering lengths L1 and L2 that provide the maximum thermal stress that is equal to the adhesive strength of 0.5 MPa are used as the reference lengths L'1 and L'2 and the covering lengths L1 and L2 of the waterproofing portion 6 are set to be greater than or equal to the reference lengths L'1 and L'2, separation of the waterproofing portion 6 during a change in temperature can be suppressed, and a high waterproofing property can be maintained when the waterproofing portion 6 is formed using various resin materials.

Furthermore, in the wire harness 1 described above, the splice portion 5 is provided as a so-called intermediate splice portion at which the two wire bundles 2 and 3 that extend in different directions are bonded, and the waterproofing portion 6 integrally covers the exposed portions of the wires 4 constituting the intermediate splice portion 5 and the covered regions 21 and 31 on both sides. However, in the present disclosure, the specific mode of the waterproofing portion of the wire harness is not particularly limited as long as the exposed portions at which the conductors of the wires are exposed from the insulating coverings and the outer surfaces of the insulating coverings, that is, the covered regions at which the conductors are covered by the insulating coverings, are integrally covered. It is sufficient that the covering length, which is the length of the region in which the waterproofing portion covers the insulating covering is set to be greater than or equal to a length at which the maximum thermal stress at the edges of the waterproofing portion that is in contact with the insulating coverings is equal to the adhesive strength of the resin material with respect to the insulating covering, or is set to be greater than or equal to a length at which the maximum thermal stress is 0.5 MPa. Note that here, the edges of the waterproofing portion are in contact with the insulating coverings in order to distinguish between the edge of the waterproofing portion on the side on which the insulating covering is provided and the edge on the side on which the insulating covering is not provided when the waterproofing portion is provided at a terminal end of a wire, or the like, as will be described later, and the edges do not necessarily need to be in contact with the outer surface of the insulating coverings.

For example, if the exposed portions of the multiple wires constituting a single wire bundle are bonded together at an end portion of the wire harness to form a terminal end splice portion, a waterproofing portion such as that described above need only be provided as the waterproofing portion covering the terminal end splice portion. Furthermore, there is no limitation to the splice portion at which the exposed portions of the multiple wires are bonded, and a mode is also given in which the above-described waterproofing portion is provided as the waterproofing portion that covers an exposed portion at which the conductor of a single wire is exposed from an insulating covering. For example, in a mode in which a connection terminal is connected at an exposed portion provided at the terminal end of one wire, a mode is conceivable in which the above-described waterproofing portion is provided at the boundary portion between the connection terminal and the wire. Alternatively, a mode is conceivable in which an exposed portion is provided at an intermediate portion of one wire and the above-described waterproofing portion is provided in a region including the exposed portion.

WORKING EXAMPLES

Hereinafter, working examples will be shown. Here, the adhesive strength of a resin material that can constitute the waterproofing portion and changes therein in a high-temperature environment were studied through actual measurement. Also, the relationship between the covering length of the waterproofing portion and the thermal stress was studied through a computer simulation. Note that the present disclosure is not limited to these working examples.

[1] Adhesive strength of resin material and changes therein in a high-temperature environment Test Method Here, the adhesive strength of a resin material constituting the waterproofing portion was measured, and furthermore, changes therein resulting from high-temperature endurance were studied.

A light-curable acrylic resin composition was used as the resin material. The acrylic resin composition was obtained by mixing 50 parts by mass of polycarbonate-based urethane acrylate oligomer and 50 parts by mass of isobornyl acrylate, and adding 0.3 parts by mass of diphenyl(2,4,6-trimethoxybenzoyl)phosphine oxide and 1.5 parts by mass of 1-hydroxycyclohexyl phenyl ketone as photoinitiators to the mixture.

A test piece obtained by arranging the above-described resin composition between two PVC plate surfaces and curing the resin material through exposure to ultraviolet light was prepared as a test piece for adhesive strength measurement. The tensile shear adhesive strength was measurement by performing a shear adhesion test in conformity with JIS K 6850 on the test piece.

The measurement of the adhesive strength was performed also in a state after high-temperature endurance. The high-temperature endurance conditions were a temperature of 85° C. and a humidity of 85% RH. The test piece was placed for a predetermined amount of time in the high-temperature endurance conditions, cooled to room temperature, and thereafter the adhesive strength was measured similarly to the description above.

Test Results

Figure 3:
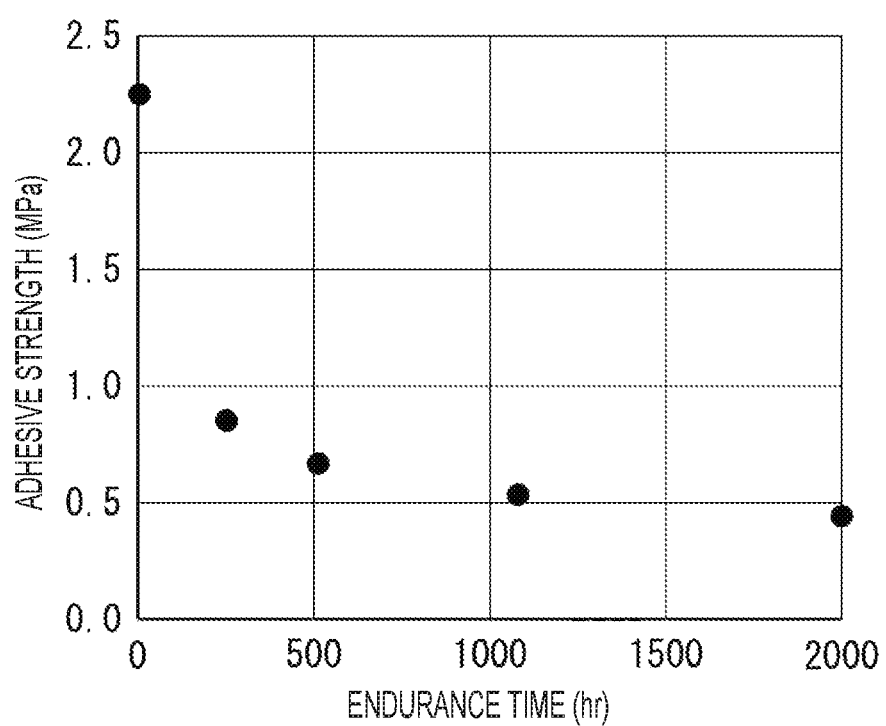
FIG. 3 is a diagram showing changes in adhesive strength of an acrylic resin with respect to polyvinyl carbonate during high-temperature endurance, obtained through actual measurement.

FIG. 3 shows the result of measuring changes in the adhesive strength accompanying high-temperature endurance. In the drawing, the horizontal axis indicates the endurance time, that is, the amount of time for which the test piece was placed in the high-temperature endurance conditions, and the vertical axis indicates the values of the adhesive strength measured with respect to the endurance times. The point of an endurance time of 0 is the result of measuring a test piece in an initial state prior to performing high-temperature endurance.

According to FIG. 3, an adhesive strength of 2.0 MPa or more is obtained in the initial state. However, due to undergoing the high-temperature endurance, the adhesive strength of the resin material decreases. The adhesive strength decreased to about 0.7 MPa upon undergoing high-temperature endurance for 500 hours. Thereafter, the adhesive strength decreases gently with respect to the increase in the endurance time, and an adhesive strength of about 0.5 MPa is maintained even in a state after a high-temperature endurance of 1000 hours. Furthermore, even if the endurance time extends to 2000 hours, the adhesive strength only decreases slightly.

[2] Relationship between covering length of waterproofing portion and thermal stress Test Method The relationship between the covering length of the waterproofing portion covering the region including the splice portion in the wire harness and the maximum thermal stress at the edges of the waterproofing portion was studied using a computer simulation.

The simulation was performed using CAE analysis. The maximum thermal stress that occurs at the edges of the waterproofing portion of the wire harness was estimated using thermal stress analysis according to a finite element method.

A wire harness 1 similar to that shown in FIG. 1 was used as the model to be simulated. The numbers of the wires constituting the wire bundles 2 and 3 were three for the first wire bundle 2 and one for the second wire bundle 3. The second covering length L2 of the second wire bundle 3 was fixed to 3 mm, and simulation was performed while changing the first covering length L1 of the first wire bundle 2. The distances from the center of the crimped terminal 51 constituting the splice portion 5 to the edges 22 and 32 of the first covered region 21 and the second covered region 31 were each 8 mm. The sheet member 7 was omitted from the model.

Wires 4 having the sizes shown in Table 1 below were used. The constituent material of the insulating coverings was PVC. The four wires 4 used in one model were all the same.

TABLE 1

| | Conductor cross-sectional area [mm$^2$] | Conductor outer diameter [mm] | Insulating covering thickness [mm] | Wire outer diameter [mm] |
|---|---|---|---|---|
| Wire A | 0.5 | 1.0 | 0.3 | 1.6 |
| Wire B | 0.85 | 1.2 | 0.3 | 1.8 |
| Wire C | 1.25 | 1.5 | 0.3 | 2.1 |
| Wire D | 2.0 | 1.8 | 0.4 | 2.6 |

An acrylic resin was applied as the resin material constituting the waterproofing portion 6. Hereinafter, properties of the acrylic resin will be listed along with properties of the PVC constituting the insulating coverings. Note that the acrylic resin applied here corresponds to a resin material used in prior actual measurement of the adhesive strength.

Acrylic Resin

Viscosity (85(C): 7 mPa

Young's modulus (room temperature): 30 mPa

Poisson's ratio: 0.4

Linear expansion coefficient: 150 ppm

PVC (Wire Covering)
Young's modulus (room temperature): 8 MPa
Young's modulus (85° C.): 2 MPa
Poisson's ratio: 0.4
Linear expansion coefficient: 280 ppm As shown in FIG. 2A, in the first covered region 21 of the wire harness 1, a gap with a distance d of 0.1 mm was provided between each of the three wires 4 and the adjacent wires 4, and the inter-wire filling portion 61 was formed by filling the gap with the resin material. Also, a thickness t of the waterproofing portion 6 on the outer circumferential portion of the first covered region 21 was 0.5 mm.

Test Results

Figure 4:
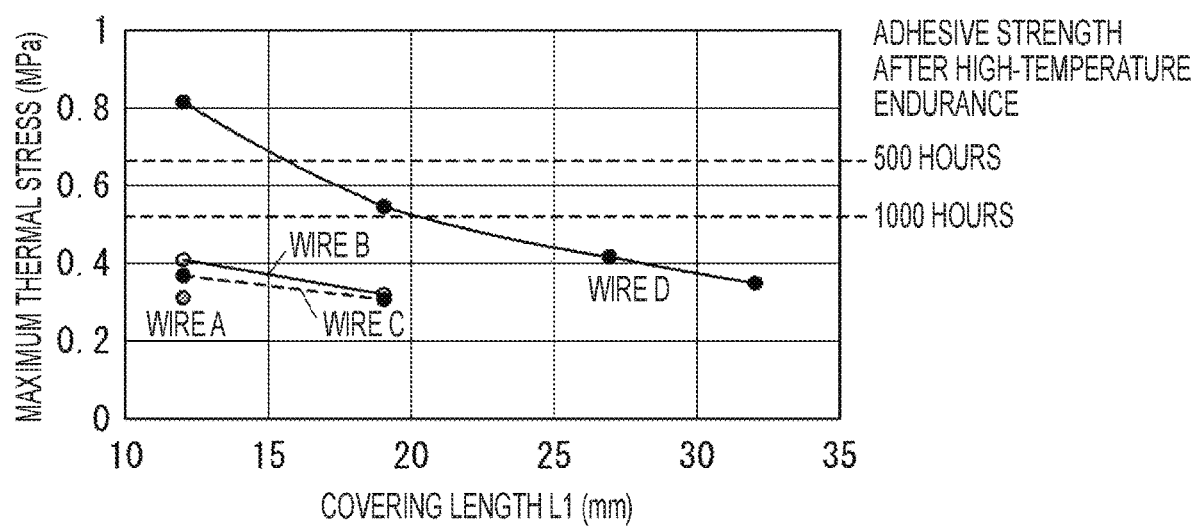
FIG. 4 is a diagram showing a relationship between a covering length and maximum thermal stress at an edge of a waterproofing portion obtained through simulation.

FIG. 4 shows a relationship between the covering length (first covering length L1) of the waterproofing portion and the maximum thermal stress at the edge of the waterproofing portion on the first covered region side, which were estimated through simulation. The horizontal axis indicates the covering length, and the vertical axis indicates the analysis results of the maximum thermal stress. Results are shown for a case in which wires A to D with different sizes shown in Table 1 above are used. In the drawings, values of the adhesive strength after high-temperature endurance for 500 hours and 1000 hours, which were obtained through an actual measurement test of the above-described adhesive strength, are indicated by broken lines.

Upon viewing the results for the case of using the wire D in FIG. 4, it can be understood that the maximum thermal stress at the edges decreases the longer the covering length of the waterproofing portion is. A similar trend is observed also for the case of using the wire B and the wire C. It is understood that this trend is the result of the amount of resin material that can contribute to the mitigation of thermal stress between the resin material and the insulating covering of the wire increasing the longer the covering length of the waterproofing portion is. Because of this, it can be said that the thermal stress can be effectively mitigated by increasing the covering length of the waterproofing portion.

Upon comparing the maximum thermal stresses in the cases of using the four types of wires with different sizes, a trend is observed in which the maximum thermal stress increases the larger the cross-sectional area of the conductor of the wire is and the thicker the insulating covering is. This trend is caused by the stress that occurs between the insulating covering and the waterproofing portion increasing the greater the volume of the insulating covering is. Also, the amount by which the maximum thermal stress is reduced by increasing the covering length increases the greater the cross-sectional area of the conductor of the wire is, and the thicker the insulating covering is. This indicates that the effect of stress mitigation resulting from increasing the amount of the resin material constituting the waterproofing portion is more prominently obtained when the volume of the insulating covering is greater and a large amount of thermal stress occurs.

If the covering length is set to 15 mm or more, the maximum thermal stress is 0.7 MPa or less, even if the wire D with the largest size is used. The maximum thermal stress of 0.7 MPa is approximately equal to the adhesive strength of the resin material after undergoing high-temperature endurance for 500 hours, indicated by the broken line in the drawing. In this manner, when the covering length is set to 15 mm or more, the maximum thermal stress at the edges of the waterproofing portion can be substantially suppressed to be less than or equal to the adhesive strength of the resin material after the high-temperature endurance for 500 hours.

Furthermore, if the covering length is set to approximately 20 mm or more, the maximum thermal stress in the case of using the wire D is less than or equal to 0.5 MPa. The maximum thermal stress of 0.5 MPa is approximately equal to the adhesive strength of the resin material after undergoing high-temperature endurance of 1000 hours, indicated by the broken line in the drawing. In this manner, when the covering length is set to 20 mm or more, the maximum thermal stress at the edges of the waterproofing portion can be suppressed to be less than or equal to the adhesive strength of the resin material after the high-temperature endurance for 1000 hours. In the cases of using the wires A to C with smaller sizes than the wire D, the maximum thermal stress is sufficiently less than the adhesive strength of 0.5 MPa in a region with a covering length of 15 mm or more.

Based on the results above, it was confirmed that the maximum thermal stress at the edges of the waterproofing portion can be effectively reduced and suppressed to be lower than the adhesive strength of the resin material by increasing the covering length of the waterproofing portion. In particular, it can be said that if a wire having a conductor cross-sectional area of 2 $mm^2$ or less and a thickness of the insulating covering of 0.4 mm or less, the maximum thermal stress at the edges of the waterproofing portion can be suppressed to a value that is less than or equal to the adhesive strength after high-temperature endurance that is actually measured with respect to the resin material by setting the covering length to 15 mm or more, or 16 mm or more with leeway, and furthermore 20 mm or more.

Although an embodiment of the present disclosure was described in detail above, the present disclosure is not limited in any way to the above-described embodiment, and various modifications are possible without departing from the gist of the present disclosure.

What is claimed is:

1. A wire harness comprising:
   a wire that includes a conductor and an insulating covering that covers an outer circumference of the conductor, and that includes an exposed portion at which the conductor is exposed from the insulating covering; and
   a waterproofing cover that integrally covers the exposed portion and an outer surface of the insulating covering with a resin material,
   wherein a covering length, which is a length of a region in which the waterproofing cover covers the insulating covering, is greater than or equal to a length at which a maximum thermal stress at an edge of the waterproofing cover that is in contact with the insulating covering is equal to an adhesive strength of the resin material with respect to the insulating covering.

2. The wire harness according to claim 1, wherein the covering length is greater than or equal to a length at which the maximum thermal stress at the edge of the waterproofing cover is 0.5 MPa.

3. A wire harness comprising:
   a wire that includes a conductor and an insulating covering that covers an outer circumference of the conductor, and that includes an exposed portion at which the conductor is exposed from the insulating covering; and
   a waterproofing cover that integrally covers the exposed portion and an outer surface of the insulating covering with a resin material,
   wherein a covering length, which is a length of a region in which the waterproofing cover covers the insulating covering, is greater than or equal to a length at which a maximum thermal stress at an edge of the waterproofing cover that is in contact with the insulating covering is 0.5 MPa.

4. The wire harness according to claim 1, wherein
the wire includes a plurality of wires and the wire harness further includes a splice body at which the exposed portions of the plurality of wires are bonded, and
the waterproofing cover integrally covers the splice body and the outer surfaces of the insulating coverings.

5. The wire harness according to claim 4, wherein
the plurality of wires form a first wire bundle and a second wire bundle that each include one or more of the wires,
the first wire bundle and the second wire bundle extend in different directions on both sides of the splice body,
the waterproofing cover integrally covers the splice body, the outer surface of the insulating covering of the first wire bundle, and the outer surface of the insulating covering of the second wire bundle, and
in both the first wire bundle and the second wire bundle, the covering length is greater than or equal to a length at which the maximum thermal stress at the edge of the waterproofing cover is equal to the adhesive strength.

6. The wire harness according to claim 4, wherein
the plurality of wires form a first wire bundle and a second wire bundle that each include one or more of the wires,
the first wire bundle and the second wire bundle extend in different directions on both sides of the splice body,
the waterproofing cover integrally covers the splice body, the outer surface of the insulating covering of the first wire bundle, and the outer surface of the insulating covering of the second wire bundle, and
in both the first wire bundle and the second wire bundle, the covering length is greater than or equal to a length at which the maximum thermal stress at the edge of the waterproofing cover is 0.5 MPa.

7. The wire harness according to claim 5, wherein
a number of the wires forming the first wire bundle is greater than a number of the wires forming the second wire bundle, and
the covering length of the first wire bundle is longer than that of the second wire bundle.

8. The wire harness according to claim 7, wherein
the covering length of the first wire bundle is at least four times that of the second wire bundle.

9. The wire harness according to claim 1, wherein
an adhesive strength of the resin material with respect to the insulating coverings is 0.5 MPa or more.

10. The wire harness according to claim 1, wherein
an adhesive strength of the resin material with respect to the insulating coverings is structured to remain at 0.5 MPa or more in a state after the wire harness has been placed for 500 hours in an environment with a temperature of 85° C. and a humidity of 85% RH.

* * * * *